Figure 1:
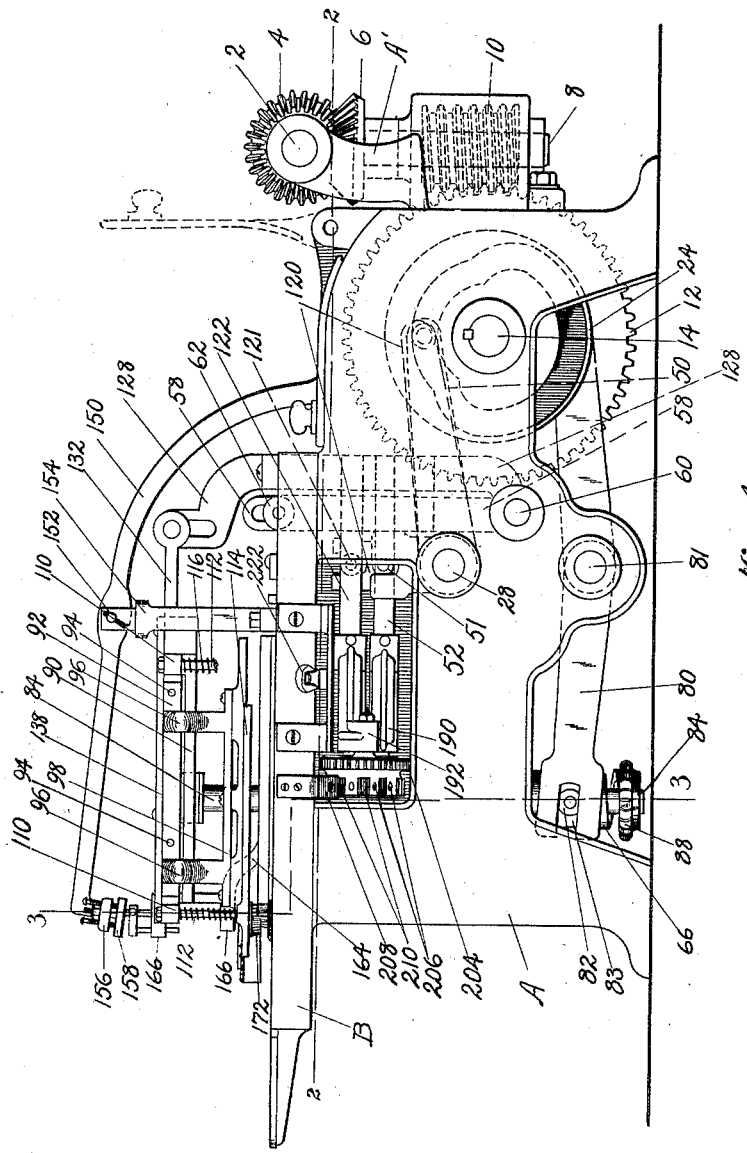

H. W. HANAN & J. H. GATES.
SLITTING AND FOLDING MACHINE.
APPLICATION FILED JAN. 31, 1903. RENEWED DEC. 21, 1912.

1,078,348.

Patented Nov. 11, 1913.

6 SHEETS—SHEET 1.

WITNESSES:
Edward H. Palmer.
Arthur L. Russell.

INVENTORS
Herbert W. Hanan
Joseph H. Gates
by their Attorney
Nelson W. Howard

H. W. HANAN & J. H. GATES.
SLITTING AND FOLDING MACHINE.
APPLICATION FILED JAN. 31, 1903. RENEWED DEC. 21, 1912.

1,078,348.

Patented Nov. 11, 1913.

6 SHEETS—SHEET 3.

WITNESSES:
Edward H Palmer.
Arthur L. Russell

INVENTORS
Herbert W. Hanan
Joseph H. Gates
by their Attorney
Nelson W. Howard

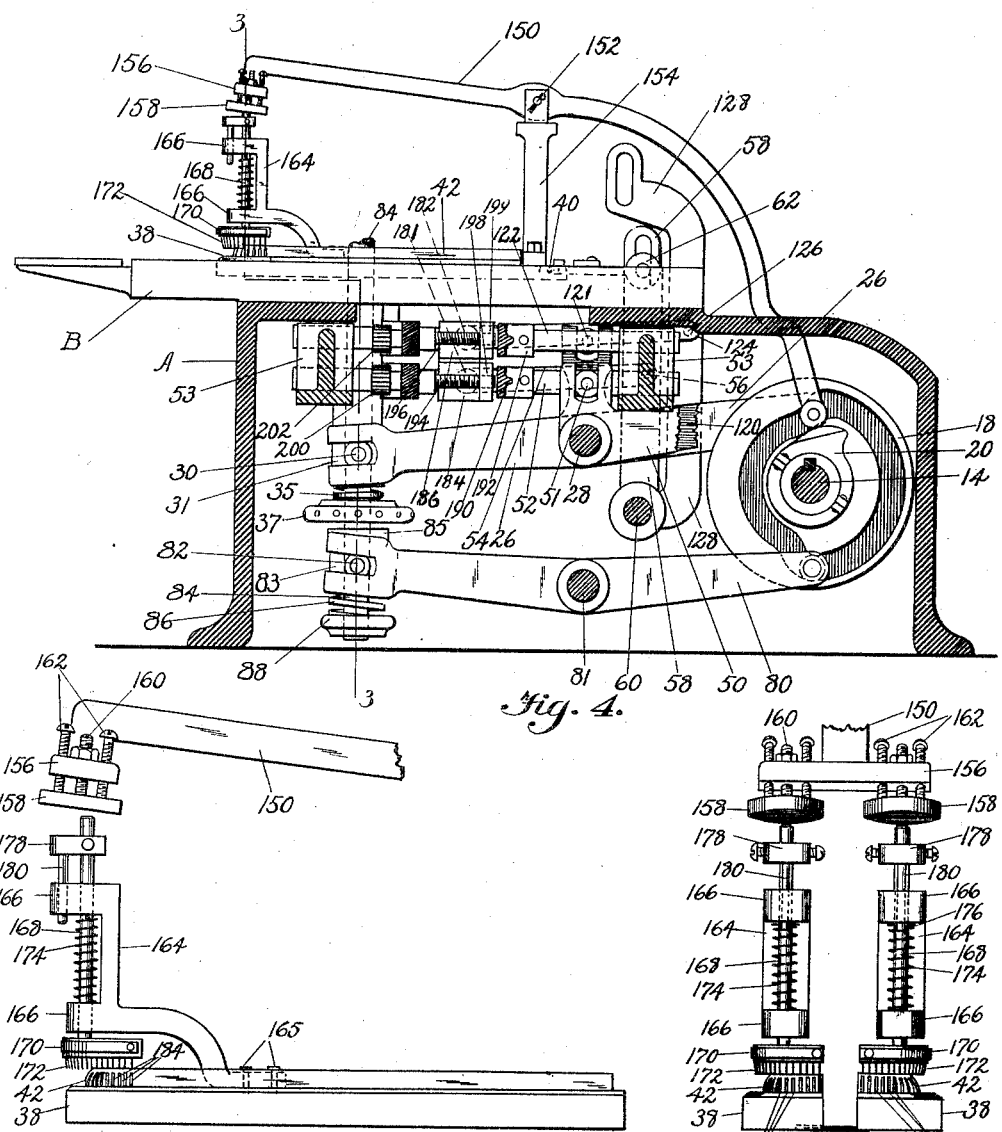

H. W. HANAN & J. H. GATES.
SLITTING AND FOLDING MACHINE.
APPLICATION FILED JAN. 31, 1903. RENEWED DEC. 21, 1912.

1,078,348.

Patented Nov. 11, 1913.

6 SHEETS—SHEET 5.

WITNESSES:
Edward H. Palmer
Arthur L. Russell

INVENTORS
Herbert W. Hanan
Joseph H. Gates

H. W. HANAN & J. H. GATES.
SLITTING AND FOLDING MACHINE.
APPLICATION FILED JAN. 31, 1903. RENEWED DEC. 21, 1912.
1,078,348.
Patented Nov. 11, 1913.
6 SHEETS—SHEET 6.
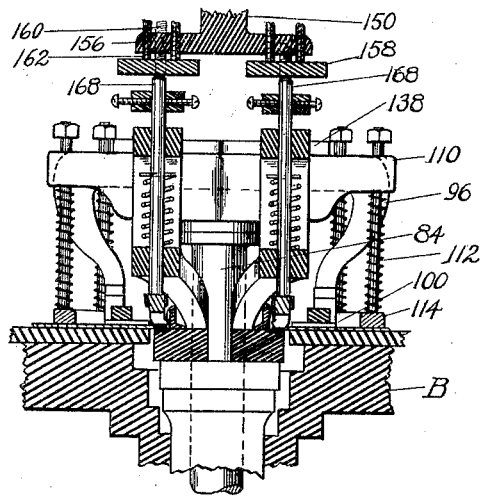
Fig. 13.
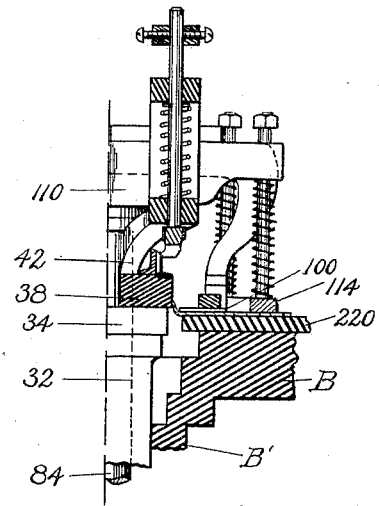
Fig. 15.
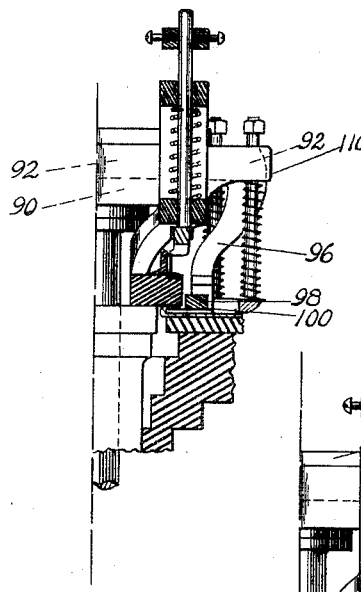
Fig. 16.
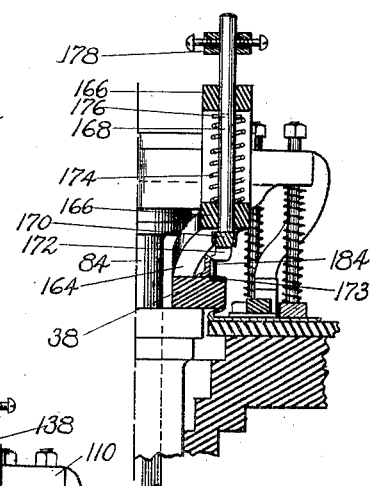
Fig. 17.
Fig. 18.
WITNESSES:
Edward H. Palmer
Arthur L. Russell
INVENTORS.
Herbert W. Hanan
Joseph H. Gates
by their Attorney
Nelson W. Howard

UNITED STATES PATENT OFFICE.

HERBERT W. HANAN AND JOSEPH H. GATES, OF NEW YORK, N. Y., ASSIGNORS, BY MESNE ASSIGNMENTS, TO BOSTON MACHINE WORKS COMPANY, A CORPORATION OF MASSACHUSETTS.

SLITTING AND FOLDING MACHINE.

1,078,348.     Specification of Letters Patent.     Patented Nov. 11, 1913.

Application filed January 31, 1903, Serial No. 141,314. Renewed December 21, 1912. Serial No. 738,079.

*To all whom it may concern:*

Be it known that we, HERBERT W. HANAN, a citizen of the United States, and JOSEPH H. GATES, a subject of the King of Great Britain, both residents of the borough of Brooklyn, in the city and State of New York, have invented a Slitting and Folding Machine, of which the following description, in connection with the accompanying drawings, is a specification, like reference characters on the drawings indicating like parts in the several figures.

This invention relates to cutting and folding machines and is herein shown as embodied in a machine for slitting and folding shoe vamps.

It is the practice to use a machine for folding vamps and other portions of the uppers of shoes, and it is necessary to slit concave edges of the stock, where such exist, before folding in order to obtain smooth folds.

The object of the present invention is to produce a machine for slitting and folding in a single operation.

The novel features of the invention will be set forth in connection with an illustrative machine and pointed out in the appended claims.

Figure 2:
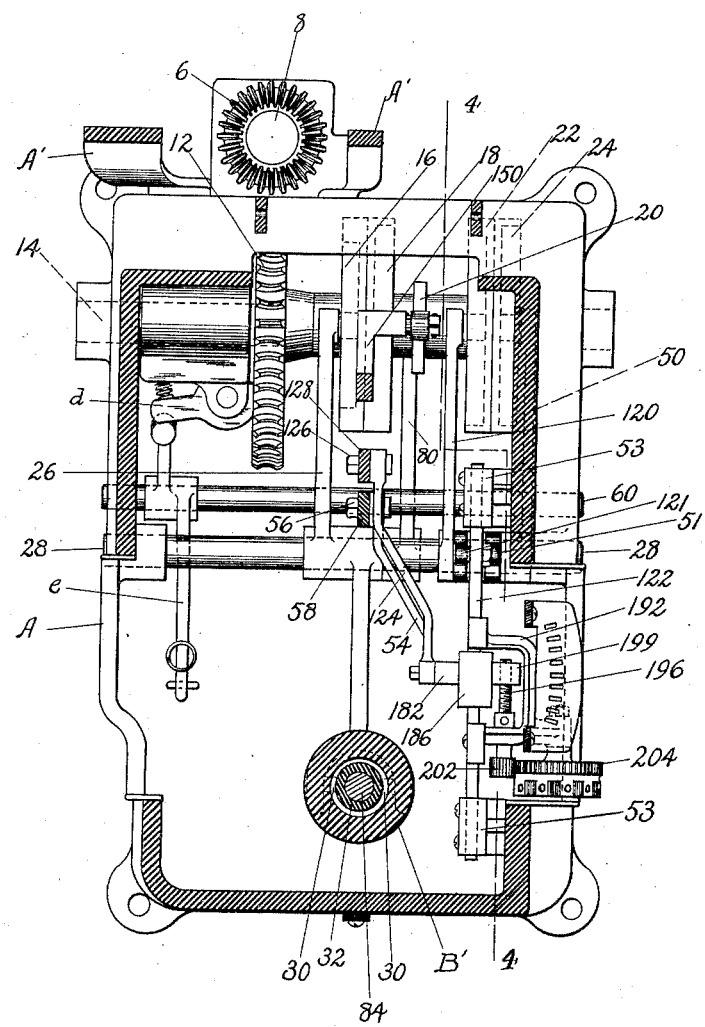
Figure 3:
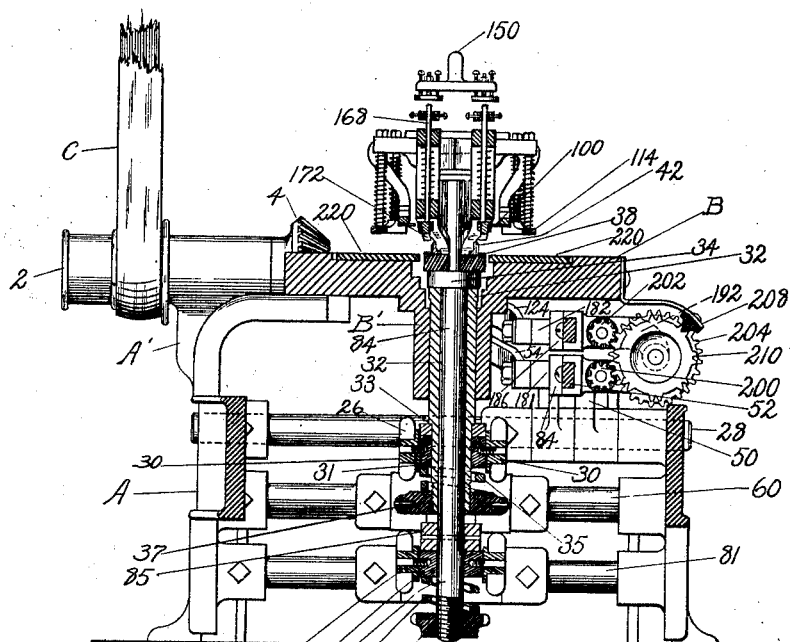
Figure 9:
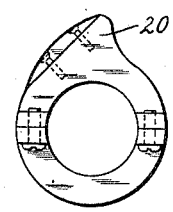
Figure 10:
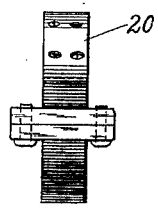
Figure 11:
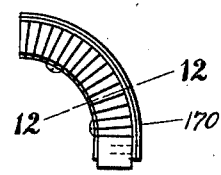
Figure 12:
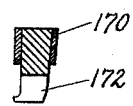
Figures 14, 19:
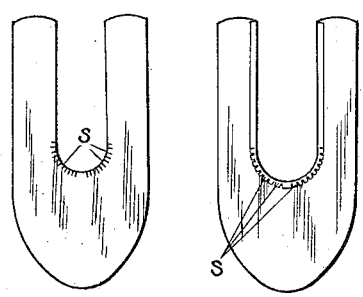
Figure 7:
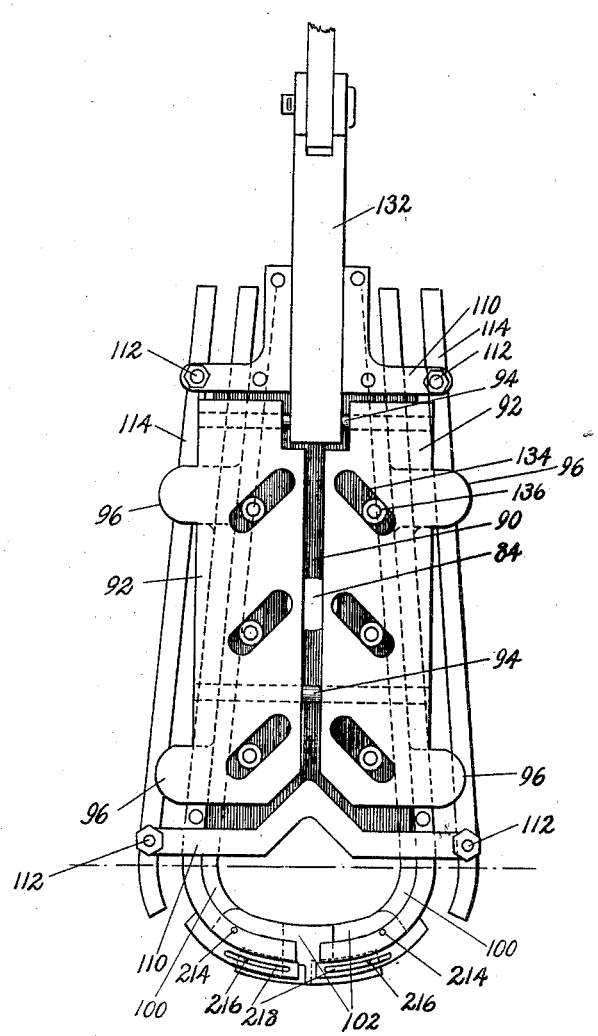
Figure 8:
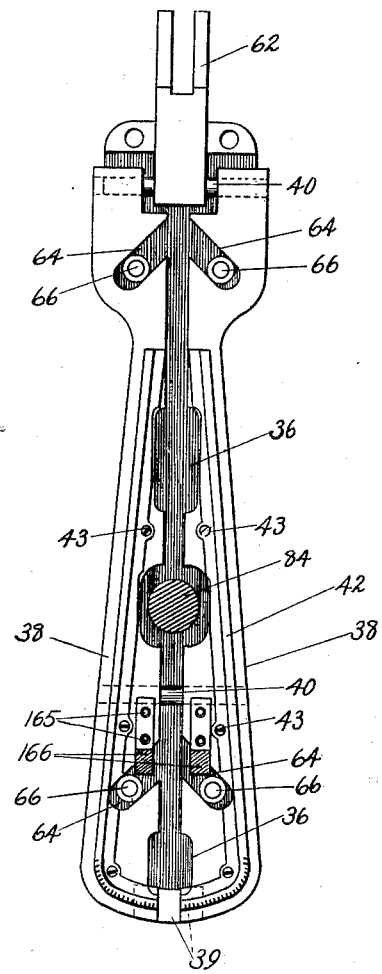

In the drawings, which show one embodiment of our invention, Figure 1 is a side elevation of the machine. Fig. 2 is a horizontal section on line 2—2, Fig. 1. Fig. 3 is a transverse, vertical section on the line 3—3 of Figs. 1 and 4. Fig. 4 is a longitudinal, vertical section on the line 4—4 of Fig. 2, the former, the work clamp and the driving mechanism being removed for the purpose of more clearly disclosing the slitting mechanism. Fig. 5 is a side elevation of the slitting mechanism on a larger scale. Fig. 6 is a front elevation of the slitting mechanism on the same scale as Fig. 5. Fig. 7 is a plan view of the former and the work clamp. Fig. 8 is a plan view of the folder and the edge gage. Fig. 9 is a side elevation of the cam for actuating the slitting mechanism. Fig. 10 is a front elevation of said cam. Fig. 11 is a detail view of the knife holder. Fig. 12 is a sectional view on line 12—12 of Fig. 11. Figs. 13, 15, 16, 17, and 18 are sectional views showing the slitting and folding mechanism and illustrating the successive steps in the operation of the machine. Fig. 13 shows the machine in the act of slitting the work, which is the first step in this operation. Fig. 14 shows a shoe vamp after it has been slitted and before it is folded. Fig. 15 shows the folder raised for lifting the edge portion of the work. Fig. 16 shows the folder moved laterally for bending the work over the former. Fig. 17 shows the former withdrawn for the purpose of allowing the fold to be completed. Fig. 18 shows the folder depressed for completing the fold. Fig. 19 shows a shoe vamp after it has been slitted and folded.

The frame work of the machine is indicated at A and the work bed at B. The frame is provided at its rear end with brackets A′, A′ in which are formed bearings for a pulley shaft 2 which is driven by a belt C. The pulley shaft is connected by beveled gears 4 and 6 with a vertical shaft 8 provided with a worm 10 for turning a gear 12 on a cam shaft 14. The gear 12 is connected to the shaft 14 by a clutch for causing one complete rotation of the shaft and then stopping it, and as here shown it is arranged to be actuated by a clutch controller $d$, and a lever $e$ connected to a foot treadle, not shown. The shaft 14 carries cams 16, 18, 20, 22, and 24 for actuating the several operating mechanisms employed for slitting and for folding the work.

A lever 26 pivoted on a rod 28 has one end engaged by the cam 16 and its other end is forked to engage studs 30 on collar 31 which slides on a sleeve 32, all as shown in Figs. 2, 3, and 4. The collar 31 is held against a shoulder 33 on said sleeve by a spring 35 and an adjusting nut 37. The sleeve 32 is guided for vertical movement in a collar B′ depending from the work bed B, and at its upper end said sleeve is firmly secured to a plate 34. The plate 34 supports the folder 38 which is made in two longitudinal sections connected by guide-pins 40 which permit the two sections to be moved laterally toward and from each other while insuring that they shall slide together when moved longitudinally. The two sections of the folder are provided at their front ends with overlapping plates 39, as shown in Figs. 6 and 8, for the purpose of preserving the continuity of the front portion of the folder when the sections thereof are moved apart, as they are in the operation of the machine, as hereinafter fully described. A gage 42 is secured by screws 43 to the upper face of the folder a short distance back from its edge. The folder is moved up and down at the proper times during the machine's operation by the lever 26 actuated by the cam 16 and acting through the sleeve 32 and plate 34. By this means the folder is lifted to raise the edge portion of the work and subsequently pulled down to press the fold.

A bell-crank lever 50, fulcrumed on the rod 28 before mentioned, has its horizontal arm in engagement with the cam 24 and its vertical arm forked to engage a stud 51 on a sliding bar 52, as shown in Figs. 1, 2 and 4. The bar 52 is guided in bearings 53, 53, and has secured to it, by an adjustable connection hereinafter described, a connecting-rod 54. The connecting-rod is secured to a lever 58 at a point 56 between the ends of the lever. The lever is fulcrumed on a pivot rod 60 and at its upper end is connected by a link 62 with the folder. The link is jointed to the folder by one of the pins 40 before mentioned, and the lever 58 is slotted at its upper end to accommodate the vertical movements imparted to the folder by the lever 26. The folder is provided with divergent slots 64 which form an angle of about forty-five degrees with the central longitudinal line of the folder, and the folder-supporting plate 34 is provided with roller studs 66 standing in the slots 64. The folder is moved horizontally at the proper times by the lever 50 actuated by the cam 24, and acting through the lever 58 and the several connecting devices, and the fixed studs 66 in the slots 64 cause the sections of the folder to be shifted toward or from each other while being moved longitudinally. By this means the folder is expanded for folding the edge portion of the work, previously raised as above described, over onto the body thereof and subsequently is restored to its normal position.

A lever 80 is mounted on a pivot rod 81 and has one end in engagement with the cam 18 while its other end is forked to embrace and engage studs 82 secured to a collar 83 on a post 84 which is movable vertically through the sleeve 32 heretofore described. The collar 83 is held against a fixed collar 85 by a spring 86 and an adjusting nut 88, see Figs. 3 and 4. The post 84 extends through an opening in the folder 38 and to its upper end is firmly secured a plate 90 upon which is supported a former-carrier 92. The former-carrier is made in two longitudinal sections connected by guide-pins 94 which permit the two sections to be moved laterally toward and from each other, but cause them to travel together when moved longitudinally, all as shown in Fig. 7. Each section of the former-carrier 92 has depending arms 96, 96, and these arms on either side are united at their lower ends by a bar 98 to which is secured a thin plate 100, and these plates constitute the former. The former-plates have overlapping end pieces 102 which preserve the continuity of the former when it is expanded.

The plate 90, which supports the former-carrier, also sustains bars 110 through which extend the stems 112 of clamps 114, 114. The stems 112 pass freely through the bars 110 and are encircled by springs 116 which bear upon the clamps and hold them normally as far down as the stems will permit.

The post 84 is moved by the lever 80, actuated by the cam 18, downwardly to force the former and the clamps into operative position on the work, and then, near the end of the folding operation, the post is raised to lift the former and then the clamps off from the work and restore them to their original positions, shown in Fig. 3.

A bell-crank lever 120 is fulcrumed on the pivot rod 28 and has its horizontal arm in engagement with the cam 22, while its vertical arm is forked to engage a stud 121 on a sliding bar 122, as shown in Figs. 1, 2, and 4. The bar 122 is guided in bearings 53, 53 which also guide the sliding bar 52. Said bar 122 has secured to it a connecting-rod 124 by an adjustable connection, hereinafter described. The rod 124 is secured at a point 126 to a lever 128, which is fulcrumed on the pivot rod 60, and at its upper end is connected by a link 132 with the former-carrier 92. The link is jointed to the former by one of the pins 94 before mentioned and the lever 128 is slotted at its upper end to permit of the above mentioned vertical movements of the former. The arrangement of the lever 120 and its connections with the former is similar to the arrangement of the lever 50 and its associated parts, before described.

The former-carrier 92 is provided with divergent slots 134 which form an angle of about forty-five degrees with the central longitudinal line of the machine, and the supporting-plate 90 is provided with a series of roller studs 136 standing in said slots. The former is moved horizontally at the proper times by the levers 120 and 128, actuated by the cam 22, and the fixed studs 136 in the slots 134 cause the sections of the former to be moved toward or from each other while being moved longitudinally. By this means the former is moved outward for withdrawing it from the path of the folder and then restoring it to its normal position when the folder has retired, as will be more fully explained. A cover plate 138 retains the parts in position.

A lever 150 is fulcrumed at 152 to a bracket 154 on the work bed B and has one end in position to be engaged by the cam 20 and its other end provided with a laterally extended head 156. Contact plates 158, 158 are adjustably connected to the laterally extended head 156 by bolts 160 and stop-screws 162, as shown in Figs. 4, 5, and 6. 164, 164 indicate brackets secured, as herein shown, by rivets 165 to the longitudinal sections of the folder 38. Each bracket has ears 166 through which is guided a cutter-carrying bar 168, the upper end of which stands under one of the contact plates 158 and to the lower end of which is secured a cutter holder 170 provided, in this embodiment of our invention, with a plurality of cutters or slitting-knives 172, see Figs. 5 and 6. The cutter-carrying bar 168 and the cutter holder are normally upheld by a spring 174 which encircles the bar, bearing at its upper end against a stop-pin 176 in said bar and at its lower end resting upon the lower ear 166 of the bracket. An arm 178 is secured to the upper portion of the cutter-carrying bar 168 and has depending from it a guide-pin 180 which is vertically movable in an opening in the upper ear 166 of the bracket and serves for holding the bar from angular displacement. The two cutting mechanisms are duplicates, as shown in Fig. 6.

The cutters 172, carried by each cutter holder, are arranged in a curved series, see Fig. 11, so as to adapt them to cut a curved series of slits $s$ in the curved inner edges of the vamp, at the corners of the U-shaped opening which is termed the "throat" of the vamp, see Fig. 14. Other forms of cutters might, of course, be used instead of the slitting cutters herein shown, or in addition to the slitting cutters. For instance, cutters for shaping the throat of the vamp might be employed. In the embodiment of the invention here shown the folder 38 serves also as the cutting bed against which the slitting knives 172 act. In order to insure that the knives shall cut entirely through the work the portion of the folder which serves as the cutting bed preferably has provision for permitting the cutters to pass below the work-supporting surface thereof. In the construction shown this is accomplished by recessing the work-supporting face of the folder and securing in the recess a strip of rawhide or other soft material and the knives are moved far enough in their downward stroke to cause their cutting edges to pass entirely through the work and into the soft material. It is obvious that other means might be provided for accomplishing the same purpose.

The gage 42, heretofore described, against which the inner edge of the vamp is positioned, has provision for permitting the knives to extend beyond the edge of the vamp and thereby insuring that the slits formed by them shall extend quite to the edge of the work. In the construction shown in the drawings the gage is provided for this purpose with a series of recesses or slots 184 to receive the inner or rear ends of the cutting edges of the knives. It will be understood that with this construction of the cutting bed and the gage the tongues formed by the slits will be entirely separate one from another.

In the operation of the machine, the parts being in the position shown in Figs. 1 and 3, a vamp is placed on the work bed with its inner edge portion overlapping the folder 38 and its edge against the gage 42. When the machine is started the clamps 114 and the former 100 are forced down on the vamp with a yielding pressure, transmitted from the cam 18 and the lever 80 through the spring 86 and the post 84. Immediately after the work has been clamped the cutters are forced down for slitting the work, by the lever 150 actuated by the cam 20, the parts at this time occupying the position shown in Fig. 13, the former 100 engaging the work close to where the cutters act on it, thus holding it from displacement by the cutters. A vamp thus slitted is shown in Fig. 14. The cutter-actuating cam 20 is of such shape, as shown in Fig. 4, that it permits the cutters to be raised immediately after they have been depressed, while the cam 18, which depresses the former and the clamps, is so shaped that it continues to maintain the former and clamps in holding engagement with the work.

As soon as the cutters have been lifted the folder is actuated, first vertically, by the cam 16 and lever 26, to raise the slitted edge portion of the vamp into a position at right angles to the adjacent body portion thereof, as shown in Fig. 15, and then horizontally, under the influence of the cam 24 and levers 50 and 58, to fold the edge portion of the vamp over the former and into a position parallel with the adjacent body portion of the vamp and also parallel with the work bed, as shown in Fig. 16. The folder then remains at rest while the former is lifted slightly by its lever 80 to free it from frictional contact with the work and then is moved outwardly from under the folded-over edge portion of the vamp by its cam 22 and levers 120 and 128, as shown in Fig. 17. The clamps, however, still remain in holding engagement with the work and the folder is next forced down to complete the fold as shown in Fig. 18. This last-mentioned movement of the folder is yieldingly effected through the lever 26 and the spring 35.

The folder remains momentarily in forcible engagement with the work to compress and make permanent the fold, while the former continues to rise, followed now by the clamp. When the fold has been sufficiently pressed the folder is lifted and restored to its normal position shown in Fig. 3. Fig. 19 shows a vamp slitted and folded by the operations just described. The slits do not extend quite to the line of fold, so that the folded edge presents an unbroken surface. It will be noted that the former 100 is brought against the work with a yielding pressure, and that said former engages the work close to where the cutters act on it and thus holds it from displacement by the cutter. Said former, therefore, constitutes a holding means for the work over which the edge of the work is folded.

In the operation of folding the work the expanding and contracting, or horizontal, movements of the former should be greater than those of the folder. This is provided for, as here shown, by making the lever 128, which moves the former horizontally, longer than the lever 58, which imparts this movement to the folder, and then swinging each lever through the same angle.

When the machine is adjusted to operate upon a different size of vamp the former and the folder are expanded or contracted to assume new initial positions, and the amount of expansion or contraction required is the same for each. As shown herein this is obtained by angularly adjusting the two levers 58 and 128. As said levers are of unequal length they must be adjusted to a different extent, the amount of the adjustment being less for the longer lever than for the shorter one, whereby the resulting contraction or expansion is equal for the folder and the former. The adjustment is made in the connections heretofore referred to between the sliding bars 52 and 122 and the links 54 and 124 respectively. This adjustment is effected as follows:—The links 54 and 124 are connected to the sliding bars 52 and 122 by studs 181, 182 that project laterally from blocks 184, 186 which are slidingly mounted on said bars 52 and 122 respectively, see Figs. 2 and 3 and dotted lines in Fig. 4. Brackets 190, 192 are rigidly secured to the said bars and in these brackets are journaled adjusting screws 194, 196 of unequal pitch which screw into lugs 198 and 199 on the blocks 184, 186. The screws 194, 196 are provided with pinions 200, 202, on their ends, and in the bracket 192 is journaled a gear 204 which meshes with the pinions on both of said screws. The hub of the gear is provided with openings 206, see Figs. 1 and 2, by which the gear may be engaged for turning it and thereby turning simultaneously both screws 194 and 196, which, by reason of their unequal pitch, slide the blocks 184 and 186 different distances along the bars 52 and 122 and so adjust the links and thereby the levers 58 and 128 the desired distances to produce the same change in the expansion or contraction of the folder and of the former. A spring locking-pawl 208 engages teeth 210 in the hub of the gear for securing the parts in adjusted position. By mounting the brackets which support the cutting mechanisms on the folder sections, as herein shown, they are properly adjusted simultaneously with the folder sections and without providing any additional adjusting mechanism. It is obvious, however, that the cutting mechanisms might be mounted on some other part of the machine and be adjusted independently of the folders.

When an adjustment is made for a different size of vamp the change in the width of the former is double the change in its length because each one of its two sections is moved laterally as much as it is moved longitudinally. This does not exactly correspond with the proper change in the vamp, for the increase or decrease in length of the throat of the vamp should be more than half its increase or decrease in width. The additional degree of adjustment is obtained by providing the former blades 100 with movable end pieces 102 which are pivotally connected to the blades 100 by pintles 214 and are provided with studs 216 guided in cam slots 218 in the bars 98 to which the former-blades are secured. The slots 218 are shaped to rock the end pieces 102 of the former-blades about their pivots 214 and give them an independent movement when the former is adjusted for contracting or expanding it. The work-supporting table is provided with face plates 220, 220 which are adjustable toward and from each other to compensate for the adjustment of the folder. The adjustment is effected by the hand lever 222 through intermediate connections, not shown, with said face plates.

While the invention is herein shown as embodied in a machine for slitting and folding shoe vamps, it is not limited to a machine for this special work, but can be employed to advantage in machines for slitting or slitting and folding any articles and especially such articles as have sharply curved edges, such, for instance, as the button-hole strips of shoes. The slitting mechanism will not be claimed *per se* since it has been made the subject matter of a separate application.

Having described a preferred form of our invention and its mode of operation, what we claim and desire to secure by Letters Patent in the United States is:—

1. In a cutting and folding machine, a folder and a cutter, in combination with means for moving the cutter toward the folder to cut the work and then reversely away from the folder, and means for moving the folder across the path of the cutter for folding the work.

2. A slitting and folding machine having, in combination, a folder; a cutter arranged to be moved toward the folder to cut the work and then to be moved away from the work; and means for moving the folder first in the path of the cutter and then laterally across said path for folding the work.

3. In a cutting and folding machine, the combination with a work-supporting table, of means for holding the work on the table, means for cutting the edge portion of the work, and means for folding the edge portion of the work over said holding means and subsequently pressing the folded edge against the work.

4. In a cutting and folding machine, the combination with means for holding the work, of means for cutting the edge portion of the work, means for folding the edge of the work over the holding means, the holding means being stationary during said folding operation; and means for withdrawing the holding means, the folder being arranged to press the folded edge against the body of the work after the holding means is withdrawn.

5. A slitting and folding machine having, in combination, a work-supporting table; a clamp arranged to clamp the work on the table; a slitting device arranged for making a slit in the edge of the work; a folding device arranged for movement to lift the slitted edge on both sides of the slit concurrently and for further movement to fold the slitted edge over on the body of the work; means for actuating the clamp to unclamp the work; and actuating mechanisms for said parts.

6. A slitting and folding machine having, in combination, a work-supporting table; means for clamping the work upon the table and for unclamping the work; means for slitting an extended portion of the edge of the work; means for lifting said slitted edge and folding it over on the body of the work supported on the table.

7. A slitting and folding machine having, in combination, a former; a slitting device arranged to slit the edge of the work; a folding device arranged to lift said edge portion and to fold it over the former and subsequently to press the folded edge portion on the body of the work, which remains in one position during the operation of the machine; said former being arranged to be withdrawn after the edge is slitted and before the folded edge portion is pressed; and actuating mechanisms for said parts.

8. A slitting and folding machine having, in combination, a cutter arranged to make a slit in the edge of the work; a folder arranged for movement to turn up said edge on both sides of the slit, to fold the edge over on the body of the work, and to press the fold; and actuating mechanisms for said parts.

9. A slitting and folding machine having, in combination, a work supporting table having an upper face to support the body of the work; means for slitting an extended portion of the edge of the work; a folder arranged to fold said slitted edge over on the work supported on said upper face of the table, and actuating mechanisms for said parts.

10. A slitting and folding machine having, in combination, a table for supporting the work during the entire operation of the machine; means for forming a plurality of slits in the edge of the work; a folder arranged to fold at one operation the entire slitted portion of said edge along a line which lies substantially within the plane of the body of the work; and actuating mechanisms for said parts.

11. A slitting and folding machine having, in combination, a work-supporting table; a folder; slitting mechanism; means for actuating the slitting mechanism to slit the edge of the work; and means for actuating the folder to fold an extended portion of the edge of the work on a line at the edge of the work-supporting table, and to press the fold against the body of the work supported on the table.

12. A slitting and folding machine having, in combination, a work-supporting table; a former arranged to clamp the work; a slitting device arranged to slit the edge of the work; a folder arranged to fold the edge portion over the former and to press the work against the face of the table, the former being withdrawn before the folder presses the work; and actuating mechanisms for said parts.

13. In a machine of the class described, a work-supporting table, a former having a curved edge and comprising a plurality of parts relatively adjustable to extend and contract said edge, cutting mechanism, and means for adjusting said cutting mechanism to compensate for the adjustment of the former.

14. A slitting and folding machine having, in combination, a folder; a cutter; means for causing the cutter to slit the edge of the work and then retire; means for causing the folder to fold at one operation the entire portion of said edge presented to the machine; and means for supporting the body of the work in one position during said operations.

15. In a machine of the class described, folding and slitting mechanism, comprising a plurality of cutting devices, a combined cutting bed and folder having a plurality of sections, means for adjusting the said sections toward and from each other, and means for correspondingly adjusting the cutting devices.

16. In a machine of the class described, folding and slitting mechanism including a folder, a former, a plurality of groups of cutters, a cutting bed for each group of cutters, means for adjusting the groups of cutters toward and from each other and similarly adjusting the cutting beds, and means for actuating said mechanism to slit and fold the work.

17. In a machine of the class described, a work-supporting table, a folder, and cutting mechanisms movable with relation to the folder for slitting the corners of a vamp, means for actuating said folder and said cutting mechanisms, and means for adjusting the folder and the cutting mechanisms to adapt them to slit and fold vamps of different sizes.

18. In a machine of the class described, a work-supporting table, cutting mechanism adapted to form a group of slits at each corner of the throat of the vamp, folding mechanism to fold the inner edge of the vamp, and means for adjusting said mechanisms to adapt them to make the slits in the corners and to form continuous folds on the edges of vamps of different sizes.

19. In a machine of the class described, a work-supporting table, a former, a folder comprising a plurality of parts, cutting devices, means for adjusting the parts of said folder, and correspondingly adjusting the cutting devices, to adapt them to operate on a greater or less extent of the edge of the work, and means for actuating said mechanisms to cause them to slit and fold the work.

20. A slitting and folding machine having, in combination, a folder arranged to fold the edge portion of the work; a knife arranged to cut a slit extending from the edge of the work inwardly; actuating mechanisms for said parts; and a gage for the edge of the work, said gage being provided with a guide slot to receive a portion of the knife.

21. In a machine for folding vamps, a former, a folder comprising a plurality of members, cutting mechanisms for slitting the corners of the vamps, and means for adjusting the members of the folder to adapt it to different sizes of vamps, said cutting mechanisms being connected with the members of the folder for adjustment therewith.

22. In a machine for folding vamps of shoes, a work-supporting table, a former, a folder comprising a plurality of members, cutting devices mounted on the folder and arranged for movement independently thereof to slit the corners of the vamp, means for adjusting the members of the folder and simultaneously the cutting devices to adapt said mechanism to slit and fold vamps of different sizes.

23. A slitting and folding machine having, in combination, an adjustable folder comprising overlapping sections to preserve the continuity of the folder when it is adjusted for pieces of work of different sizes, and an adjustable cutting device arranged to coöperate with said folder sections to cut different sizes of work.

24. In a slitting and folding machine, a former, a folder having a U-shaped working edge to fold the edge of the work over the former and composed of a plurality of parts overlapped at their ends, in combination with cutting mechanism for forming slits in the curved portions of the edge of the work, and means for imparting adjusting movements to the parts of the folder and to the cutting mechanims for adapting them to slit and fold pieces of work of different sizes.

25. In a machine for slitting and folding shoe vamps, cutting mechanisms and actuating means therefor, a folder comprising a plurality of sections forming a U-shaped working edge, actuating means for moving said sections diagonally toward and from each other for folding the vamp, means for adjusting said sections diagonally toward and from each other for giving said folder new initial positions for folding vamps of different sizes, said cutting mechanisms being similarly adjustable diagonally toward and from each other to compensate for the adjustment of the folder.

26. In a machine of the class described, folding mechanism including a folder and actuating means therefor, cutting mechanism carried by said folder, and means for actuating said cutting mechanism, said actuating means being arranged to permit the cutting mechanism to be moved with relation thereto in the operation of the folder.

27. In a machine of the class described, folding mechanism including a folder having relatively movable sections and actuating means therefor, cutting mechanisms carried by said folder sections, and means for actuating said cutting mechanisms, said actuating means being arranged to maintain operative relation to said cutting mechanisms during the movements of the latter with the folder sections.

28. In a cutting and folding machine, cutters and a combined folder and cutting bed having provision for permitting the cutters to pass below its work-supporting surface after cutting the work, in combination with means for actuating the cutters to cut the work, and means for moving the folder first perpendicularly to the work and then parallel therewith for folding the work.

29. A machine of the class described, comprising a work-supporting table, a former, a folder, cutting knives, and a gage for the edge of the work, said gage being cut away adjacent to the path of the knives to permit the knives to extend beyond the edge of the work, and mechanism for actuating said parts to form slits extending from the edge of the work inwardly and to fold the slitted portion of the work.

30. A slitting and folding machine having, in combination, a work-supporting table; a combined folder, presser and cutting-bed; and a slitting knife which coöperates with said combined folder, presser and cutting-bed to slit, fold and press the edge of the work.

31. A slitting and folding machine having, in combination, a folder; a slitting knife which coöperates with said folder to slit the edge of the work; means for moving the knife independently of the folder; and means for actuating the folder to fold the edge of the work on both sides of the slit and subsequently press the folded edge against the body of the work.

32. A slitting and folding machine having, in combination, a work-supporting table, means for holding the body of the work on said table during the entire operation of the machine; a folder; a slitting knife; means for causing the slitting knife to make a slit in the edge of the work before the folder begins to operate; and means for causing the folder to fold the edge of the work on both sides of said slit concurrently.

33. A slitting and folding machine having, in combination, a folder; means to form a plurality of slits in the edge of the work before the folder begins to operate; means for causing the folder to fold the slitted portion of the edge of the work; and means for holding the body of the work in one position during said operations.

34. A slitting and folding machine having, in combination, a table arranged to support the body of the work in one position during the operations of the machine; a folder; a slitting knife; a gage which is constructed to permit the knife to extend beyond the edge of the work; means for actuating the knife; and means for actuating the folder.

35. A folding and slitting machine having, in combination, a work-supporting table; a folder; a slitting knife; an upwardly projecting gage, the face of the gage being recessed to permit portions of the knife to move in a path posterior to said face; means for moving said knife to slit the edge of the work; and means for causing the folder to fold the slitted edge of the work.

36. In a machine of the class described, a cutter, a folder provided with an upper face to support the edge of the work during the operation of the cutter; and means for actuating the folder first to lift the edge of the work and subsequently to fold the edge over on the body of the work.

37. In a machine of the class described, a former and a table arranged to hold the work between them; means for slitting the edge of the work; a folder to fold said edge over the former and subsequently press the folded edge against the body of the work; and actuating mechanisms for said parts.

38. In a folding machine, a table, a removable folder coöperating therewith to make a fold, a slitter mounted on the folder and removable therewith, and means to actuate the slitter independently of the folder.

39. In a cutting and folding machine, the combination with a work-supporting table, of means for holding the work on the table, means for cutting the edge portion of the work, a folder, and means for effecting a relative movement between the work-supporting table and folder to fold the edge portion of the work over said holding means and subsequently to press the folded edge against the work.

40. In a cutting and folding machine, the combination with a work-supporting table, of means for holding the work on the table, means for cutting the edge portion of the work while it is held on the table by said holding means, and means for causing the edge portion of the work to be folded over said holding means and subsequently to be pressed against the work.

41. A slitting and folding machine having, in combination, a work-supporting table, a former-plate, a slitting device arranged to slit the edge of the work, a folding device, means to secure a relative movement between the table and folding device to cause the slit edge portion of the work to be turned up and folded over the former-plate and subsequently to cause said folded edge portion to be pressed against the body of the work which remains in one position on said table during the operation of the machine, and means to withdraw the former-plate after the edge is slitted and before the folded edge portion is pressed.

42. A slitting and folding machine having, in combination, a work-supporting table having an upper face to support the body of the work, means for slitting an extended portion of the edge of the work, a folder, and means to secure a relative movement between the folder and the table to cause said slitted edge to be folded over on the work supported on said upper face of the table, and to be pressed against the body of the work.

43. A slitting and folding machine having, in combination, a work-supporting table, a combined folder, pressing element and cutting bed, and means including a slitting knife which coöperates with said combined folder, pressing element and cutting bed to slit, fold and press the edge of the work.

44. A slitting and folding machine having, in combination, a work-supporting table, a folder, means to form a plurality of slits in the edge of the work before the folding operation is begun, means for causing a relative movement of the folder and table to cause the slitted edge of the work to be folded, and means for holding the body of the work in one position on said work-supporting table during said operations.

45. In a cutting and folding machine, the combination with means for holding the work, of means for cutting the edge portion of the work, means for folding the edge of the work over the holding means, said holding means being stationary relative to the work during said folding operation, and means for withdrawing the holding means, the parts being arranged to act against the folded edge and press the same against the body of the work after the holding means is withdrawn.

46. A slitting and folding machine having, in combination, a work supporting table, a former plate mounted to clamp the work, a slitting device arranged to slit the edge of the work, a folder, means to move the table and folder relatively to each other to cause the edge portion of the work to be folded over the former plate and to be pressed against the face of the work, and means for withdrawing said creaser plate before the fold is pressed.

47. A slitting and folding machine having in combination, a folder, a cutter, means for moving the cutter toward the folder to slit the edge of the work and then reversely away from the folder, means to cause the entire portion of said edge to be folded by the folder at one operation, and means for supporting the body of the work during said operations.

48. In a cutting and folding machine, a folder, a work-supporting table and a cutter, in combination with means for moving the cutter toward the folder to cut the work and then reversely away from the folder, and means for securing a relative movement of the folder and table in a direction across the path of the cutter for folding the work.

49. A slitting and folding machine, having in combination a work-supporting table, a folder, a cutter arranged to be moved toward the folder to cut the work and then to be moved away from the work, and means for securing a relative movement of the folder and the table first in the path of the cutter and then laterally across said path for folding the work.

50. In a cutting and folding mechanism, a work supporting table, cutters, and a combined folder and cutting bed having provision for permitting the cutters to pass below its work-supporting surface after cutting the work, in combination with means for actuating the cutters to cut the work, and means for securing a relative movement between the table and the folder first perpendicular to the work and then parallel therewith for folding the work.

51. In a machine of the class described, a work-supporting table, a cutter, a folder provided with an upper face to support the edge of the work during the operation of the cutter, and means for securing a relative movement between the folder and table first to lift the edge of the work and subsequently to fold the edge over on the body of the work.

52. A slitting and folding machine having in combination a former, means for forming a plurality of slits in the edge of the work, a folder and means associated therewith arranged to turn the slitted portion of said edge around said former and subsequently to bring the turned edge and the body of the work together, and means for withdrawing said former, the parts being arranged to support during the entire operation of the machine the body of the work back of the fold and in the same plane as that portion of the body onto which the folded edge is pressed.

53. A slitting and folding machine having in combination a former, means for forming a plurality of slits in the edge of the work, a folder and means associated therewith arranged to turn the slitted portion of said edge around said former and subsequently to bring the turned edge and the body of the work together, means for withdrawing the former after the edge is turned around it, and means for supporting the work back of and close up to the fold and for holding the work on its support during the entire operation of the machine.

In testimony whereof we have signed our names to this specification in the presence of two subscribing witnesses.

HERBERT W. HANAN.
JOSEPH H. GATES.

Witnesses:
  JEAN B. STOUVENEL,
  NELSON W. HOWARD.

---

Copies of this patent may be obtained for five cents each, by addressing the "Commissioner of Patents, Washington, D. C."